United States Patent Office 2,830,034
Patented Apr. 8, 1958

2,830,034

STABILIZATION OF ETHYLENE POLYMERS BY CONTACT WITH GROUP VI METAL COMPOUNDS

John T. Rundquist, Wilmington, Del., assignor to E. I. du Pont de Nemours and Company, Wilmington, Del., a corporation of Delaware No Drawing. Application July 21, 1954
Serial No. 444,915

4 Claims. (Cl. 260—45.75)

This invention relates to the stabilization of the solid high molecular weight polymers of the monoolefins. In particular it relates to effecting stabilization of such polymers, and especially polyethylene by treatment with metal compounds.

It has been discovered that one of the major causes of instability in the solid high molecular weight polymers of the monoolefins is the existence of hydroperoxide groups probably introduced by oxidation principally during the polymer forming and finishing operations. The presence of such groups has been detected by research studies leading up to the process of the invention, which studies have also resulted in the discovery that the presence, even in minute amounts of hydroperoxide groups, lowers the stability of such polymers. Striking improvements in the physical characteristics of these polymers with a concomitant improvement in melt stability has been observed when the hydroperoxide content of the unstable polymers is reduced by chemical or other methods. The invention of this application is directed to an improved method of stabilizing these solid polymers by the removal of such groups whereby their initially superior physical properties can be retained.

An object of the present invention is to provide a process for destroying the effectiveness of the hydroperoxides in the solid high molecular weight polymers of monoolefins. Another object is to provide a process by which the said solid polymers are treated in the molten state with reducing agents whereby the free radical potential of the hydroperoxides present is destroyed. Yet another object is to provide a process in which a solid polymer of ethylene is stabilized by being brought into intimate contact with metal compounds. Other objects and advantages of the invention will appear hereinafter.

Maintenance of the physical properties of the ethylene polymers has been sought by investigators in this field of polymer chemistry who have been rewarded, with some degree of success, by the addition of anti-oxidants and/or stabilizing agents to the polymers as produced by the catalytic high pressure, high temperature processes of Fawcett et al. U. S. 2,153,553, Larson et al. U. S. 2,405,-965, and like processes of others. Polymers prepared in accord with the patented processes have many superior physical properties, some of which tend to change during extended working during extruding, molding, and like treatment. Undesired changes often occur in spite of careful pretreatment, for the ethylene polymers often suffer loss in fabricability as well as loss in physical properties due primarily to necessary exposure to elevated temperatures.

Protection of the polymers of ethylene against such losses is accomplished in accord with the invention by chemical modification of the hydroperoxide to a non-radical producing compound. This can be accomplished in any suitable manner such, for example, as by chemical or catalytic reduction. Chemically, this is accomplished by reduction of the hydroperoxide with lithium aluminum hydride, or other suitable reducing agent, preferably at elevated temperatures. Catalytically, it is accomplished by subjecting the hydroperoxide to the action of a reducing catalyst or to the action of a hydrogenation catalyst, preferably in the presence of hydrogen. The preferred embodiment of the invention is conducted by contacting the hydroperoxide containing hydrocarbon polymers with the oxides and sulfides of the metals of group VI of the "periodic table of the elements" which have an atomic weight of at least 52.

The treatment may be carried out in any suitable manner that provides intimate contact between the reducing agent and the hydroperoxides present in the polymer. By way of example, this contact may be established by dissolving the polymer in a suitable solvent, adding the reducing agent in finely divided form to the solution, and thoroughly mixing the resulting slurry at a suitable temperature and in the presence of hydrogen, if desired, until the concentration of the hydroperoxide has been sufficiently reduced to render it ineffective. Contrariwise, the polymer can be heated to its molten state and passed in that state through a fixed bed of the reducing agent, or a dispersion of the polymer can be added to a dispersion of the reducing agent and the resulting mixture thoroughly agitated. Any other suitable means of effectively contacting the reducing agents with the hydroperoxides present in the polymer may be employed.

The hydroperoxide content of a solid olefin polymer, such as polyethylene, has been found to be quite small. Analyses have detected amounts ranging from $15 \times 10^{-4}$ milliequivalents up to about $50 \times 10^{-4}$ milliequivalents per gram of polymer or more. The influence of the hydroperoxide however, is surprisingly disproportionate to the amount present. It is believed that these peroxides are formed during the handling and particularly during the procedural steps involved in drying, melting, and extruding the polymer. Subsequent decomposition of the hydroperoxide during fabrication and storage of the polymer gives free radicals which are responsible to a large extent, it is believed, for initiating the degradation of the polymer.

Because of the relatively small amount of the hydroperoxide present, every effort must be made to insure intimate contact between the reducing agent and the hydroperoxide. Moreover, the temperature for effective destruction of the hydroperoxide should range between 80° C. and 350° C. Treatment with the group VI metal oxide or sulfide at such temperatures will reduce the concentration to less than about $2 \times 10^{-4}$ milliequivalents per gram of the polymer. Solution treatment temperatures are generally limited by the boiling point of the solution used under the pressure on the solution. Usually a temperature of 200° C. for solution treatment is ample. Moreover, the quantity of the reducing agent used is of lesser importance than the manner in which it is used. Generally a much greater amount of the agent is employed than is necessary to destroy the effectiveness of the hydroperoxide, although this is not a requirement of the process. After the treatment the reducing agent may, if desired, be recovered for reuse.

A melt tensiometer has been developed and has proved to be most effective in measuring the stability of solid olefin polymers. This instrument, more fully described in the copending application of R. H. Spangler and R. E. Jolly, S. N. 430,564, includes a melt extruder from which a filament is formed from a melt of the polymer. For the purpose of measuring melt stability, a melt of the polymer is maintained at a given temperature, is extruded at a constant flow rate, and the extruded filament is collected at a constant rate. During these operations, the stress on the filament is measured and continuously recorded. For a number of ethylene polymers, it has been found that satisfactory conditions for determining melt stability are: temperature of the molten polymer, 225° C.; flow rate of the polymer over a period of ten minutes, 2.5 grams; and take-up rate of the extruded filament, 5 feet per minute.

Melt stability has, for convenience, been defined arbitrarily as the slope of the melt tensiometer line over an interval between two minutes and five minutes—any other time interval can, of course, be selected as desired. The melt stability (slope of the line) is expressed in milligrams per minute; the greater the slope of the line, the poorer is the melt stability of the polymer. For example, a polymer, produced and worked in the complete absence of air and containing no hydroperoxide, has a slope in milligrams per minute of "0"; while the same polymer in a fluffy state, dried in air at 50° C. and having a hydroperoxide content of $40 \times 10^{-4}$ milliequivalents per gram of polymer, has a slope of 270 on the same basis.

In the examples which follow, preferred embodiments of the invention are described in which parts are by weight unless otherwise noted.

*Example I.*—One gram of molybdenum catalyst pellets was pulverized and added to one liter of purified toluene. The catalyst composition was 96% molybdenum trisulfide containing 4% graphite. Twenty grams of polyethylene resin cubes was added to the suspension of catalyst in toluene and brought into solution by heating to reflux temperature with stirring under an atmosphere of nitrogen. After 20 hours of such treatment, the catalyst was filtered, while hot, from the solution and the polymer precipitated by pouring the hot filtrate into methanol. A white powder was recovered and dried at 50° C. for 72 hours and under reduced pressure, ca. 125 mm. Hg. The properties of the polymer, before and after the treatment, are described in Table I.

*Example II.*—A bed of molybdenum trisulfide catalyst such as that employed in Example I, without comminution and having a tablet size of 1/8", was disposed in a jacketed, straight bore condenser (1×36 cm). The condenser was attached to a 2-liter, 3-necked, R. B. flask, which in turn was attached to a take-off to a vacuum line. A solution of 20 grams of polyethylene resin cubes in 1-liter of purified toluene was prepared under a nitrogen atmosphere. This solution was poured into the top of the catalyst column and sucked through by applying a vacuum to the receiver. The column was heated by a steam jacket, the contact time of the polymer in the catalyst bed was about 53 seconds. The polymer was then treated as described in Example I. The initial and final properties of the polymers treated are tubulated in Table I.

*Example III.*—One gram of the molybdenum trisulfide catalyst described in Example II and six grams of polyethylene resin cubes were blended by shaking in a 1/2 pint container. The mixture was fed to a melt extruder and heated to a temperature of 162° C. The melt of the polymer was forced by superimposed pressure from an orifice in the base of the extruder; the catalyst pellets were retained in the extruder. The properties of several polymers before and after treatment are described in Tables II and III.

*Example IV.*—A catalyst bed was prepared by placing molybdenum trisulfide cylindrical tablets of 1/8" diameter on a metal screen in a metal, tubular container. This catalyst bed and tube were jacketed to maintain a temperature of about 175° C. during operation. Through this bed a normally solid polymer of ethylene in the molten state was passed. The properties of the initial and final polymers are described in Tables II and III.

The tables illustrate properties of the polymers before and after treatment in accord with Examples I through IV, and include, in addition, other embodiments of the invention.

Table I

CATALYTIC STABILIZATION OF POLYETHYLENE BY SOLUTION TECHNIQUES

| Process used (see examples) | Reducing agent | A* ×10⁴ | Melt tensiometer data | | | | Remarks |
|---|---|---|---|---|---|---|---|
| | | | $T_2$ (g.) | $T_5$ (g.) | $T_{10}$ (g.) | Slope (mg./min.) | |
| None | None | 19.7 | 1.0 | 4.7 | 8.4 | 1,220 | Cubes. |
| 1 | do | 50.0 | 2.7 | 7.2 | >7.2 | 1,500 | Solution blending control. |
| 1 | MoS₃ | 1.08 | 1.6 | 1.7 | 1.7 | 30 | |
| 2 | MoS₃ | | 2.9 | 2.8 | 3.2 | −45 | |

NOTE.—A*=milliequivalents of hydroperoxide per gram of polymer.

Table II

CATALYTIC STABILIZATION OF POLYETHYLENE BY MELT TECHNIQUES

| Process used (see examples) | Reducing agent | Melt tensiometer data | | | | Remarks |
|---|---|---|---|---|---|---|
| | | $T_2$ (g.) | $T_5$ (g.) | $T_{10}$** (g.) | Slope (mg./min.) | |
| None | None | 1.0 | 4.7 | 8.4 | 1,220 | Cubes. |
| 3 | do | 1.7 | 4.1 | 6.1 | 780 | Extrusion blank. |
| 3 | MoS₃ | 1.3 | 1.3 | 1.3 | 0 | |
| None | None | 0.9 | 1.4 | 1.6 | 155 | Cubes. |
| 3 | do | 1.3 | 1.6 | 1.9 | 90 | Extrusion blank. |
| 3 | MoS₃ | 1.3 | 1.3 | 1.3 | 0 | |
| None | None | 1.6 | 2.5 | 3.3 | 280 | Cubes. |
| 3 | do | 2.2 | 3.1 | 3.8 | 315 | Extrusion blank. |
| 3 | MoS₃ | 1.5 | 1.5 | 1.4 | 0 | |
| None | None | 1.8 | 5.5 | 10.0 | 1,230 | Cubes. |
| 4 | do | 1.7 | 6.8 | 11.8 | 1,680 | Extrusion blank. |
| 4 | MoS₃ | 1.8 | 2.6 | 3.5 | 250 | |

**$T_2$—$T_5$—$T_{10}$ are the filament tensions in grams at 2, 5, and 10 minutes respectively.

Table III

STABILIZATION OF POLYETHYLENE BY A VARIETY OF MOLYBDENUM TRISULFIDE AND OTHER CATALYSTS

| Process used | Reducing agent | Melt tensiometer data | | | | Remarks |
|---|---|---|---|---|---|---|
| | | $T_2$ (g.) | $T_5$ (g.) | $T_{10}$ (g.) | Slope (mg./min.) | |
| None | None | 1.0 | 4.7 | 8.4 | 1,220 | Cube control. |
| 3 | do | 1.7 | 4.1 | 6.1 | 780 | Extrusion blank. |
| 3 | MoS₃ | 1.3 | 1.3 | 1.3 | 0 | 96% MoS₃—4% graphite. |
| 3 | MoS₃ | 1.5 | 1.6 | 2.0 | 60 | MoS₃ on kieselguhr support. |
| 3 | MoO₃ | 1.7 | 3.1 | 4.2 | 475 | MoO₃ on kieselguhr. |
| 3 | Tungsten-nickel sulfide. | 1.5 | 2.9 | 3.7 | 470 | |

While the examples have been directed principally to the removal of hydroperoxides from the normally solid polymers of ethylene, the invention is more extensive. Other normally solid polymers of the olefins and other unsaturated hydrocarbons and oxygenated hydrocarbon polymers can be similarly stabilized as well as the fluid forms of the polymers. In essence, one of the broader aspects of the invention is the discovery that hydroperoxides, when present in such polymeric compounds, can be rendered innocuous by treatment in accord with the process herein taught.

I claim:

1. A process for the stabilization of a normally solid polymer of ethylene containing at least $15 \times 10^{-4}$ milliequivalents of hydroperoxides per gram of polymer which comprises preparing a catalyst from a compound of the group consisting of the oxides and sulfides of a metal of group VI of the "periodic table of the elements" having an atomic weight of at least 52, disposing said catalyst in a reaction zone, and passing through the catalyst the solid polymer of ethylene in a molten state.

2. A process for the stabilization of ethylene polymers containing at least $15 \times 10^{-4}$ milliequivalents of hydroperoxides per gram of polymer which comprises subjecting ethylene polymers to contact under temperatures between 80° C. to 350° C. with a molybdenum sulfide catalyst.

3. A process for stabilizing the normally solid polymers of ethylene containing at least $15 \times 10^{-4}$ milliequivalents of hydroperoxides per gram of polymer which comprises dissolving a solid polymer of ethylene in a solvent, adding to the resulting solution a molybdenum sulfide catalyst, and intimately commingling the metal compound with the solution of the polymer at temperatures between 80° C. and 200° C.

4. A process for the stabilization of a normally solid polymer of ethylene containing at least $15 \times 10^{-4}$ milliequivalents of hydroperoxides per gram of polymer which comprises preparing a molybdenum sulfide catalyst, disposing said catalyst in a reaction zone, and passing through the catalyst the solid polymer of ethylene in a molten state.

References Cited in the file of this patent

UNITED STATES PATENTS

| | | |
|---|---|---|
| 2,277,504 | Wiley | Mar. 24, 1942 |
| 2,480,297 | Goldrick | Aug. 30, 1949 |
| 2,582,510 | Stiratelli | Jan. 15, 1952 |
| 2,692,257 | Zletz | Oct. 19, 1954 |